Dec. 9, 1969  K. ELLINGEN  3,482,375
ELECTROFILTER WITH CORRUGATED SHEET
METAL-TYPE COLLECTING ELECTRODES
Filed June 28, 1968
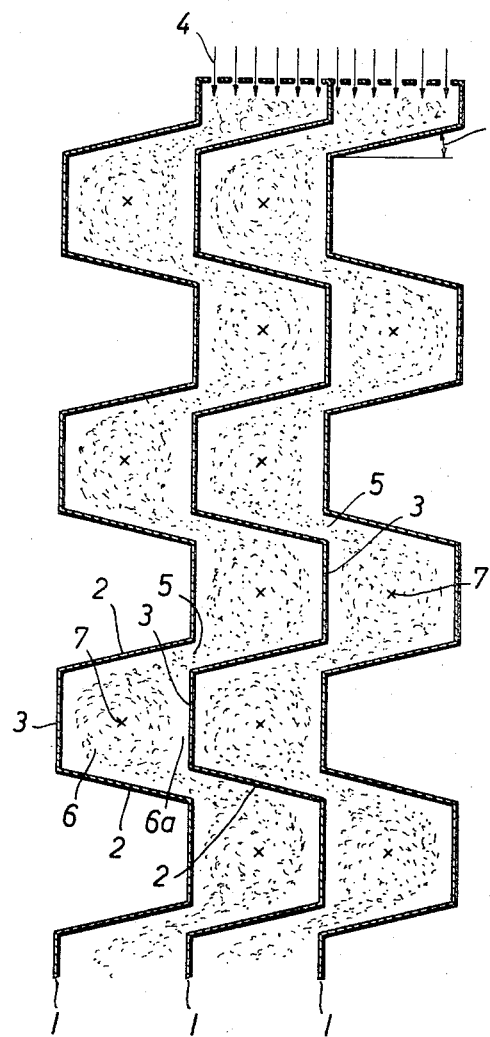
INVENTOR
Karl Ellingen
BY Singer, Stern & Carlberg
Attorneys

United States Patent Office 3,482,375
Patented Dec. 9, 1969

3,482,375
ELECTROFILTER WITH CORRUGATED SHEET METAL-TYPE COLLECTING ELECTRODES
Karl Ellingen, Cologne-Holweide, Germany, assignor to Klockner-Humboldt-Deutz Aktiengesellschaft, Cologne-Deutz, Germany, a corporation of Germany
Filed June 28, 1968, Ser. No. 740,892
Claims priority, application Germany, Jan. 25, 1968, 1,632,460
Int. Cl. B03c 3/00
U.S. Cl. 55—151
2 Claims

ABSTRACT OF THE DISCLOSURE

An electrofilter comprises a plurality of parallel collecting electrodes in the form of corrugated plates having their troughs and ridges substantially vertical and transverse to a gas stream to be filtered, said electrodes being so arranged relative to each other that the crests of said ridges partially close the open side of the troughs, thereby providing restricted flow paths for the gas at both edges of said crests.

---

The invention relates to electrofilters with several corrugated sheet metal-type collecting electrodes arranged parallel at mutual spacing for a gas flow directed transversely or inclined to the approximately vertically extending corrugation troughs and ridges.

Sheet metal-type collecting electrodes are known per se. In the German Patent No. 438,972, corrugated collecting electrodes are described, in which the dust deposited is supposed to drop through slots into a box formed of each two adjacent corrugated metal plates. In similar manner corrugated sheet metal-type collecting electrodes are arranged according to the German Patent No. 487,866 whereby, however, the corrugations are provided with openings for the passage of dust and the sheet metal plates are so disposed, that between them are formed tubular inner spaces for the deposit of dust.

The invention has as basis the problem of improving the utilization of space by means of the elimination of pockets which are contacted neither by the gas current nor by the electric fields, and in this way attaining in the entire interior of the electrofilter uniformly spreading electric fields, as far as possible to all sides.

The solution of the problem was arrived at by making the flow cross-section to both sides of the crests of the corrugation ridges of adjacent collecting electrodes narrower, and by providing in the center of the widened spaces formed between the opposed crests of adjacent collecting electrode ridges spark electrodes which extend parallel to said ridges.

In the drawing, an example of the electrode arrangement according to the invention is shown diagrammatically in sectional plan view.

The corrugated collecting electrodes 1, of which three are illustrated, are shown as provided with flat ridge sides 2 and similar flat ridge crests 3. The direction of gas flow is indicated by the arrows 4. The electrodes are so arranged parallel to each other that on both sides of the crests 3 and in the plane thereof are produced narrow flow cross-sections 5, while between the flat parallel crests 3 of adjacent collecting electrodes 1 are formed much wider spaces 6 in whose center rod-shaped spark electrodes 7 are arranged which extend transversely to the flow direction. The advantage of the arrangement according to the invention consists therein, that in the part of the widened space 6, which has the greatest distance from the narrow cross-sections 5, only a low speed gas flow takes place, so that the dust deposited here may be knocked off, without causing any appreciable quantities of dust to be carried off again by the gas flow. In addition, the curving gas stream through the chamber 6 has the result that dust deposit is favored by the centrifugal forces acting on the dust particles. In the center of the widened space 6 spark electrodes 7 are disposed, which for example may consist of rods or tensioned wires. Since the electrical field will be distributed very uniformly in the widened space 6, the dust depoist takes place in the part of the space facing away from the narrow passages 5 not only by electrostatic force but also with the assistance of centrifugal force. In the oppositely disposed portion 6a of the space 6 there is less dust deposition due to the higher speed of the gas flow. However, the electrostatic force causes a dust concentration in the vicinity of the wall of the adjacent collecting electrode 1, which leads to a favoring of the precipitation of dust in the more quiet portion of the widened space 6 following in direction of the gas flow. The drawing illustrates only the basic arrangement. The size of the ridge side angle 8 and of the spacing of the dust collecting electrodes 1 depend upon the particular conditions, just as does the selection of the corrugation shape with flat or curved ridge sides 2 and crests 3 or rounded transitions from side to crest. For rigidifying of the entire system adjacent collecting electrodes 1 may be connected here and there, for instance, at the narrow cross-sections 5 by means of braces, not shown in the drawing.

As a result of elimination of dead spaces and due to the compact arrangement of the spark electrodes under favorable electrostatic and flow conditions, the invention makes possible the construction of filters having a great capacity with small space requirement. The cost of manufacture is favorably influenced not only by the small material requirement, but also by the simple shape of the electrodes.

What I claim is:
1. An electrofilter, comprising a plurality of parallel collecting electrodes in the form of corrugated plates having their troughs and ridges substantially vertical and forming between every two adjacent electrodes a flow path for a gas stream moving transversely of said troughs and ridges, each ridge of one of said electrodes being aligned transversely of the flow path with one ridge of each of the other electrodes facing in the same direction so that the crests of the ridges of one electrode partly close the open sides of the troughs in the adjacent electrodes, thereby leaving restricted passages for the gas flow at both edges of said crests, and an elongated spark electrode extending longitudinally along the approximate center line of each of said troughs.
2. The electrofilter as set forth in claim 1, in which each of said troughs is substantially trapezoidal in transverse cross-section.

References Cited

UNITED STATES PATENTS

| | | | |
|---|---|---|---|
| 1,956,591 | 5/1934 | Gies | 55—130 |
| 2,672,207 | 3/1954 | Hedberg | 55—148 X |
| 2,884,087 | 4/1959 | Matts | 55—130 X |
| 2,903,089 | 9/1959 | Latham | 55—130 X |
| 3,362,135 | 1/1968 | Stevernagel et al. | 55—154 X |

FOREIGN PATENTS

| | | |
|---|---|---|
| 83,347 | 3/1921 | Austria. |
| 431,216 | 7/1926 | Germany. |
| 464,858 | 12/1928 | Germany. |
| 701,416 | 1/1941 | Germany. |
| 835,012 | 5/1960 | Great Britain. |
| 138,721 | 1/1953 | Sweden. |

HARRY B. THORNTON, Primary Examiner

DENNIS E. TALBERT, Jr., Assistant Examiner

U.S. Cl. X.R.

55—154, 440